(12) United States Patent
Usui (10) Patent No.: US 6,959,791 B2
(45) Date of Patent: Nov. 1, 2005

(54) MOTOR-DRIVEN DISK BRAKE

(75) Inventor: Takuya Usui, Yamanashi-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/721,188

(22) Filed: Nov. 26, 2003

(65) Prior Publication Data
US 2004/0104088 A1 Jun. 3, 2004

(30) Foreign Application Priority Data
Nov. 29, 2002 (JP) .............................. 2002-349207

(51) Int. Cl.[7] .......................... F16D 65/18; F16D 55/08
(52) U.S. Cl. .................... 188/72.1; 188/72.8; 188/158; 188/162; 188/71.8
(58) Field of Search .............................. 188/72.1, 72.8, 188/72.7, 156, 158, 162, 72.3, 216, 71.8–71.9, 188/161, 196, 157; 310/93, 77, 94, 49 R (56) References Cited

U.S. PATENT DOCUMENTS

| | | | |
|---|---|---|---|
| 6,179,097 B1 * | 1/2001 | Schumann | 188/162 |
| 6,257,377 B1 * | 7/2001 | Schumann | 188/72.8 |
| 6,374,958 B1 * | 4/2002 | Usui et al. | 188/72.7 |
| 6,491,140 B2 * | 12/2002 | Usui et al. | 188/72.1 |
| 6,571,921 B2 * | 6/2003 | Ohtani et al. | 188/72.1 |
| 2003/0066719 A1 * | 4/2003 | Watanabe et al. | 188/72.7 |
| 2004/0035655 A1 * | 2/2004 | Usui | 188/161 |

FOREIGN PATENT DOCUMENTS

| | | | |
|---|---|---|---|
| JP | 2001-343038 | * | 12/2001 |
| WO | WO00/60255 | * | 10/2000 |

\* cited by examiner

Primary Examiner—Douglas C. Butler
(74) Attorney, Agent, or Firm—Wenderoth, Lind & Ponack, L.L.P.

(57) ABSTRACT

A motor-driven disk brake having a caliper containing a piston for pressing a brake pad, a rotary actuator and a rotary-to-rectilinear motion converting mechanism for transmitting rotation of the rotary actuator to the piston after converting it into rectilinear motion. The piston is driven in response to rotation of the rotary actuator to press the brake pad against a disk rotor, thereby generating braking force. A brake releasing mechanism for returning the rotary-to-rectilinear motion converting mechanism to its initial position in the event of a failure in the rotary actuator is interposed between a rotating member and a rectilinearly moving member that constitute the rotary-to-rectilinear motion converting mechanism. The brake releasing mechanism has an urging device for generating a torque in the direction for returning the piston in response to the rotation of the rotating member in the direction for advancing the piston. The urging device generates a torque greater than the rotational resistance of the rotating member of the rotary-to-rectilinear motion converting mechanism.

18 Claims, 4 Drawing Sheets

MOTOR-DRIVEN DISK BRAKE

BACKGROUND OF THE INVENTION

The present invention relates to a motor-driven disk brake for generating braking force by using a torque obtained from a rotary actuator. More particularly, the present invention relates to a motor-driven disk brake having a brake releasing function capable of automatically releasing the brake from a lock-up state caused by a failure of the rotary actuator.

A conventional motor-driven disk brake has a caliper containing a piston, a rotary actuator and a motion converting mechanism for transmitting rotation of the rotary actuator to the piston after converting it into rectilinear motion. The piston is driven in response to rotation of the rotary actuator to press a brake pad against a disk rotor, thereby generating braking force in proportion to the torque of the rotary actuator. In this type of motor-driven disk brake, if the rotary actuator fails owing, for example, to disconnection of the power supply line during braking when braking thrust is being generated in the piston, the thrust remains in the piston because of the internal resistance of the rotary actuator and the internal resistance of a speed-reducing gear if it is provided to increase the rotational torque of the rotary actuator. Consequently, it becomes difficult to release the brake.

Under these circumstances, some schemes have heretofore been devised to automatically release the brake in the event of a failure in the rotary actuator. For example, International Publication WO 00/60255 (hereinafter referred to as "patent document 1" discloses that the, rotor of a motor is provided with a spring to rotate the rotor in reverse by the return force of the spring. Published Japanese Translation of PCT International Publication No. 2000-507333 (corresponding U.S. Pat. No. 6,179,097: hereinafter referred to as "patent document 2") discloses that an electric motor for returning the piston is incorporated in a part of a speed-reducing mechanism attached to the motor, and the motor for returning the piston is activated in the event of a failure in the main electric motor for advancing the piston. Published Japanese Translation of PCT International Publication No. 2001-506348 (corresponding U.S. Pat. No. 6,257,377; hereinafter referred to as, "patent document 3") discloses that an electromagnetic clutch is provided in a thrust load bearing part for bearing the nut of the motion converting mechanism, and in the event of a motor failure, the electromagnetic clutch is released to retract the nut.

However, with the scheme disclosed in the patent document 1, the amount of deflection of the spring increases with the rotation of the rotor. Therefore, the rotor has to be rotated against a large spring force for each braking operation. Because the amount of rotation of the rotor increases in accordance with the degree of wear of the brake pad, the consumption of electric power for rotating the rotor increases with age. In addition, because the return force of the spring increases in proportion to the wear of the brake pad, a stable operation cannot be obtained.

The scheme disclosed in the patent document 2 requires a motor for releasing the brake in addition to the main motor for advancing the piston. Therefore, not only the caliper unavoidably increases in size, but also the production cost increases. Moreover, there is also possibility that the brake releasing motor itself may fail. Therefore, the brake lacks reliability.

The scheme disclosed in the patent document 3 suffers from problems such as an increase in power consumption due to the supply of power to the electromagnetic clutch and an increase in cost due to the provision of the electromagnetic clutch.

The present invention was made in view of the above-described problems with the prior art.

An object of the present invention is to provide a highly reliable motor-driven disk brake made capable of being released mechanically in the event of a motor failure without causing an increase in power consumption and a large increase in production cost.

SUMMARY OF THE INVENTION

The present invention provides a motor-driven disk brake having a caliper containing a piston, a rotary actuator and a rotary-to-rectilinear motion converting mechanism for transmitting the rotation of the rotary actuator to the piston after converting it into a rectilinear motion. The piston is driven in response to rotation of the rotary actuator to press a brake pad against a disk rotor, thereby generating braking force. The motor-driven disk brake is provided with a pad wear compensating mechanism for advancing the piston relative to a rectilinearly moving member in the rotary-to-rectilinear motion converting mechanism in accordance with wear of the brake pad. The pad wear compensating mechanism has a rotatable limiter engaged with a rotating member in the rotary-to-rectilinear motion converting mechanism with play in the direction of rotation. A resilient member is provided between the rotating member in the rotary-to-rectilinear motion converting mechanism and the limiter in the pad wear compensating mechanism. The resilient member generates a set load greater than a non-loaded-state rotational resistance of the rotating member and stores a torque in accordance with relative rotation between the rotating member and the limiter during braking.

In the motor-driven disk brake arranged as stated above, if the brake has locked up owing to a failure of the rotary actuator during braking, the rotating member of the rotary-to-rectilinear motion converting mechanism is rotated in a direction reverse to the direction of rotation during braking by the torque stored in the resilient member during braking. Consequently, the rotary-to-rectilinear motion converting mechanism returns to its initial position. Thus, the brake is automatically released. In this case, the torque to be stored in the resilient member is produced only by the relative rotation of the rotating member in the rotary-to-rectilinear motion converting mechanism and the limiter in the pad wear compensating mechanism-within the range of play. Therefore, the amount of deflection of the resilient member becomes constant after the relative rotation has ceased. Hence, there is no possibility that the consumption of electric power for rotating the rotary actuator will increase with age. There is also no possibility that the production cost will particularly increase, because the resilient member is merely provided between the rotating member and the limiter.

If the resilient member is a coil spring wound concentrically with the rotating member or the limiting to store a torsional torque, the resilient member can be accommodated compactly in the caliper. Therefore, it is possible to prevent an increase in size of the caliper.

DETAILED DESCRIPTION OF THE INVENTION

Embodiments of the present invention will be described below in detail with reference to the accompanying drawings.

Figure 1:
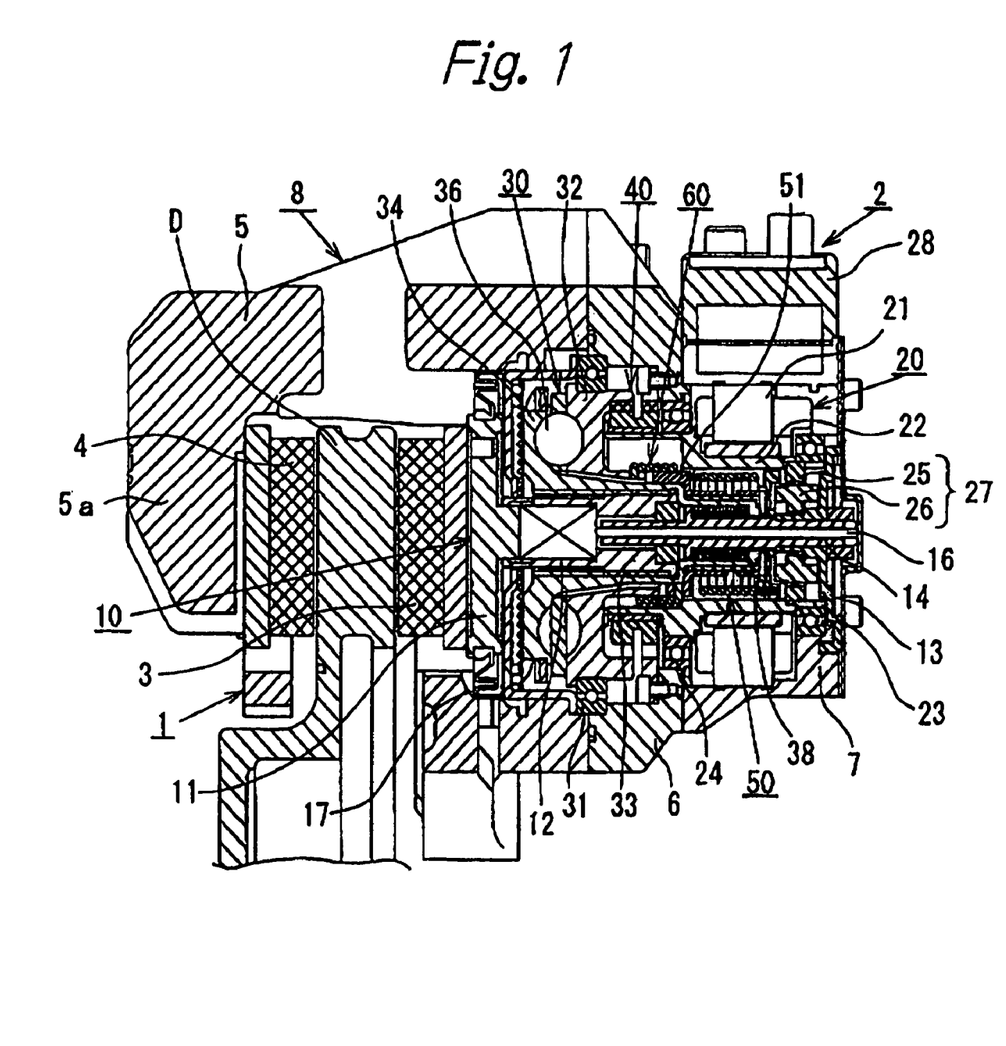
FIG. 1 is a vertical sectional view showing the general structure of a motor-driven disk brake according to one embodiment of the present invention.
Figure 2:
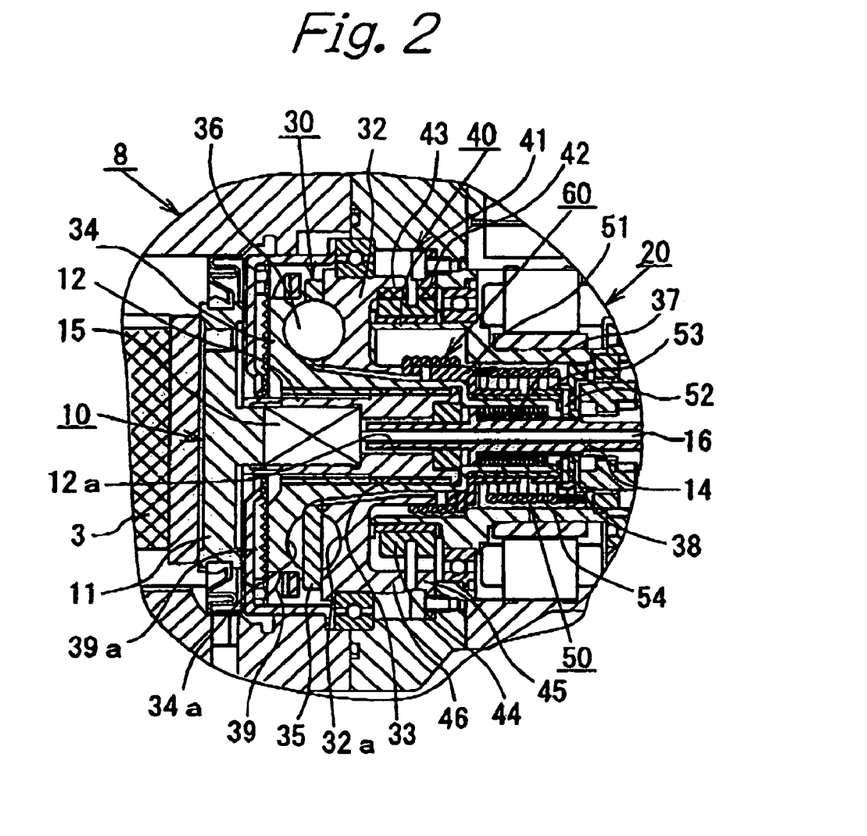
FIG. 2 is an enlarged sectional view of an essential part of the motor-driven disk brake shown in FIG. 1.

FIGS. 1 and 2 show a first embodiment of the motor-driven disk brake according to the present inventions. In these figures, a carrier 1 is secured to a non-rotating part (e.g. a knuckle) of a vehicle that is located at the inner side of a disk rotor D relative to the vehicle. A caliper 2 is supported by the carrier 1 so as to be floatingly movable in the axial direction of the disk rotor D. A pair of brake pads 3 and 4 are disposed at both sides of the disk rotor D. The brake pads 3 and 4 are supported by the carrier 1 in such a manner as to be movable in the axial direction of the disk rotor D. The caliper 2 has an assembly type caliper body 8 including a claw member 5 having a claw portion 5a at the distal end thereof. The caliper body 8 further includes an annular base 6 connected to the proximal end of the claw member 5, and a motor casing 7 secured to the base 6. The claw portion 5a of the claw member 5 is disposed in close proximity to the back of the outer brake pad 4, which is located at the outer side of the disk rotor D relative to the vehicle.

The caliper 2 further has a piston 10 capable of abutting on the back of the inner brake pad 3, which is located at the inner side of the disk rotor D relative to the vehicle. Further, the caliper 2 has a motor (rotary actuator) 20 and a ball-ramp mechanism (rotary-to-rectilinear motion converting mechanism) 30 for transmitting rotation of the motor 20 to the piston 10 after converting it into a rectilinear motion. A speed-reducing mechanism 40 transmits the rotation of the motor 20 to the ball-ramp mechanism 30 after reducing the speed thereof. A pad wear compensating mechanism 50 changes the initial position of the piston 10 according to the degree of wear of the brake pads 3 and 4 to compensate for wear of the pads 3 and 4. In addition, the caliper 2 has a coil spring 54 and a coil spring (resilient member) 60 serving as a brake releasing mechanism for releasing the brake by automatically returning the ball-ramp mechanism 30 to its initial position in the event that the motor 20 fails during braking.

The piston 10 comprises a large-diameter piston body 11 and a small-diameter shaft member 12 that are connected together so as to form a unitary body. The piston body 11 is disposed in close proximity to the inner brake pad 3. The shaft member 12 extends to a considerable extent toward the motor casing 7. The shaft member 12 is provided with an axial bore 12a. A hollow support rod 14 extends from an end plate 13 secured to the motor casing 7. The distal end portion of the support rod 14 is inserted in the axial bore 12a slidably but non-rotatably relative to the shaft member 12. In this embodiment, a thrust detecting sensor 15 is interposed between the piston body 11 and the shaft member 12 to detect braking counterforce (braking thrust) applied to the piston 10 from the brake pad 3. The thrust detecting sensor 15 in this embodiment comprises a load cell. A detection signal obtained from the thrust detecting sensor 15 is delivered to an external controller (not shown) through a cable 16 extending through the hollow inside of the support rod 14. It should be noted that a rubber cover 17 is spread over between the piston body 11 and the claw member 5 of the caliper body 8 to isolate the interior of the caliper body 8 from the outside.

The motor 20 has a stator 21 fitted and secured to the motor casing 7 and a hollow rotor 22 disposed in the stator 21. The rotor 22 is rotatably supported by the motor casing 7 and the base 6 through bearings 23 and 24. The motor 20 is operated to rotate the rotor 22 through a desired angle with a desired torque according to an instruction from a controller (not shown). The rotation angle of the rotor 22 is detected with a rotation detector 27 comprising a resolver rotor 25 secured to the rotor 22 and a resolver stator 26 secured to the end plate 13 of the motor casing 7. It should be noted that the motor casing 7 is equipped with a connector 28 for routing signal lines connecting the stator 21 of the motor 20 and the rotation detector 27 to the controller. In this embodiment, the rotary actuator comprises the motor 20 having the stator 21 and the rotor 22 as stated above. However, the present invention is not necessarily limited to the above. It is also possible to use other electrically-driven rotary actuators, e.g. an ultrasonic motor.

The ball-ramp mechanism 30 has a hollow first disk (rotating member) 32 rotatably supported by the inner peripheral portion of the base 6 of the caliper body 8 through a bearing 31. A hollow second disk (rectilinearly moving member) 34 is engaged with the shaft member 12 of the piston 10 through a threaded portion 33. Balls 36 are disposed between the two disks 32 and 34 by using a retainer 35. The mutually opposing surfaces of the first disk 32 and the second disk 34 are formed with three pairs of arcuate ball grooves 32a and 34a extending along the circumferential direction. The balls 36 are interposed between the three pairs of ball grooves 32a and 34a. The portion (threaded portion 33) of the second disk 34 that is engaged with the shaft member 12 of the piston 10 is provided with an extended cylindrical portion 37 extending to a considerable extent toward the end plate 13 of the motor casing 7. A bevel disk springs 38 are disposed in the cylindrical portion 37. The bevel disk springs 38 are retained at one end thereof by the support rod 14 to normally urge the second disk 34 toward the first disk 32 through the cylindrical portion 37. On the other hand, the second disk 34 is restrained from rotating by frictional force of a wave washer 39 attached to the caliper body 8 through a support plate 39a. Thus, if the first disk 32 rotates relative to the second disk 34, the balls 36 roll on the slant bottom surfaces of the ball grooves 32a and 34a, causing the second disk 34 to advance toward or retract from the disk rotor D. The piston 10 follows the movement of the second disk 34.

The speed-reducing mechanism 40 includes an eccentric gear 44 having first and second external gears 42 and 43. The eccentric gear 44 is rotatably fitted on an eccentric shaft 41 integral with the rotor 22. A first internal gear 45 is fixed to the caliper body 8 and meshed with the first external gear 42 of the eccentric gear 44. A second internal gear 46 is provided on the back of the first disk 32 and meshed with the second external gear 43 of the eccentric gear 44. The eccentric gear 44 rotates on its own axis while revolving in response to the rotation of the eccentric shaft 41 (rotor 22) by meshing with the first internal gear 45 and the second internal gear 46. Consequently, the first disk 32 rotates with a predetermined rotation ratio (speed reduction ratio) with respect to the rotor 22 because the number of teeth of the first internal gear 45 and that of the second internal gear 46 differ from each other.

Let us assume that the number of teeth of the first external gear 42 is Z1; the number of tenth of the second external gear 43 is Z2; the number of teeth of the first internal gear 45 is n1; and the number of teeth of the second internal gear 46 is n2. Then, the speed reduction ratio N is given by $N=1-(n1 \times Z2/Z1/n2)$. Accordingly, if the rotor 22 of the motor 20 rotates through a certain rotation angle $\theta$, the rotation angle of the first disk 32 is $\theta \cdot N$. In this case, if the slant (lead) of the ball grooves 32a and 34a of the ball-ramp mechanism 30 is denoted by L, the second disk 34 advances by $S=(L/360) \times (\theta \cdot N)$. It should be noted that when the speed reduction ratio N is a value larger than 0, the first disk 32 rotates in the same direction as the rotor 22, whereas when the speed reduction ratio N, is a value smaller than 0, the first disk 32 rotates in a direction opposite to the direction of rotation of the rotor 22.

The pad wear compensating mechanism 50 includes a limiter 51 rotatably fitted on the extended cylindrical portion 37 of the second disk 34 in the ball-ramp mechanism 30. The limiter 51 is operatively associated with the first disk 32. A spring holder 53 is fitted on the extended cylindrical portion 37 of the second disk 34 and fixed in position relative to the second disk 34 with pins 52. A coil spring (resilient member) 54 is disposed around the spring holder 53. One end of the coil spring 54 is connected to the limiter 51. The other end of the coiled spring 54 is connected to the spring holder 53.

Figure 3:
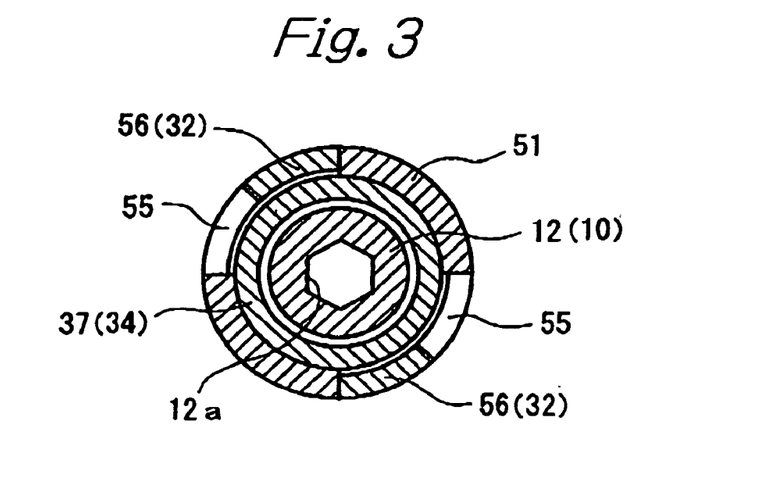
FIG. 3 is a sectional view showing a joint structure of a rotating member in a ball-ramp mechanism and a limiter in a pad wear compensating mechanism that constitute the motor-driven disk brake according to the present invention.

As shown clearly in FIG. 3, the limiter 51 has a plurality (two in this embodiment) of circumferentially extending grooves 55 on one end portion thereof. The grooves 55 are equally spaced in the circumferential direction of the limiter 5. Each groove 55 is in engagement with an arcuate engagement projection 56 projecting from the rear end of the first disk 32. Each groove 55 of the limiter 51 has a circumferential length sufficiently greater than the width of the engagement projection 56 of the first disk 32. Accordingly, the limiter 51 and the first disk 32 are rotatable relative to each other within a range in which each engagement projection 56 is movable within the associated groove 55. In other words, the limiter 51 is engaged with the first disk 32 with a predetermined play in the direction of rotation. The limiter 51 and the spring holder 53 each have a detent portion (not shown) at one position in the rotational direction thereof. The respective detent portions of the limiter 51 and the spring holder 53 come in engagement with each other in the rotational direction to limit the relative rotation in one direction of the limiter 51 and the spring holder 53. The coil spring 54 is interposed between the limiter 51 and the spring holder 53 with a predetermined offset so as to allow the detent portions to engage with each other. That is, the coil spring 54 applies a predetermined set load to the limiter 51 and the spring holder 53. The set load or pre-load has been set greater than the total frictional force produced from the wave washer 39 and the bevel disk springs 38 (hereinafter referred to simply as "the frictional force of the wave washer 39"), which restrains the second disk 34 from rotating. Consequently, if there is wear on the brake pad 3, the rotation of the rotor 22 is transmitted to the second disk 34 through the coil spring 54, causing the piston 10 (not rotatable) to advance through the threaded portion 33. Thus, the pad wear is compensated for.

The coil spring 60 serving as the brake releasing mechanism is wound around the first disk 32 in the ball-ramp mechanism 30 and also around the limiter 51 in the pad wear compensating mechanism 50. The first disk 32 and the limiter 51 are operatively associated with each other by engagement between the engagement projections 56 and the grooves 55. One end of the coil spring 60 is connected to the first disk 32. The other end of the coil spring 60 is connected to the limiter 51. The coil springs 60 has a smaller spring force than that of the coil spring 54 in the pad wear compensating mechanism 50. The coil spring 60 is interposed between the first disk 32 and the limiter 51 so as to apply a set load greater than the non-loaded-state rotational resistance of the first disk 32 in the ball-ramp mechanism 30. It should be noted that it is also possible to use a spiral spring, a bevel disk spring, or a resilient member, e.g. a rubber or resin member, besides a coil spring. In this embodiment, however, the use of a coil spring as the resilient member allows it to be accommodated compactly in the caliper 2 and hence makes it possible to or vent an increase in size of the caliper 2.

The following is a description of the operation of the motor-driven disk brake arranged as stated above. The description will be made on the assumption that there is wear on the brake pads 3 and 4, with reference to FIG. 4 as well as FIGS. 1 to 3.

Figure 4:
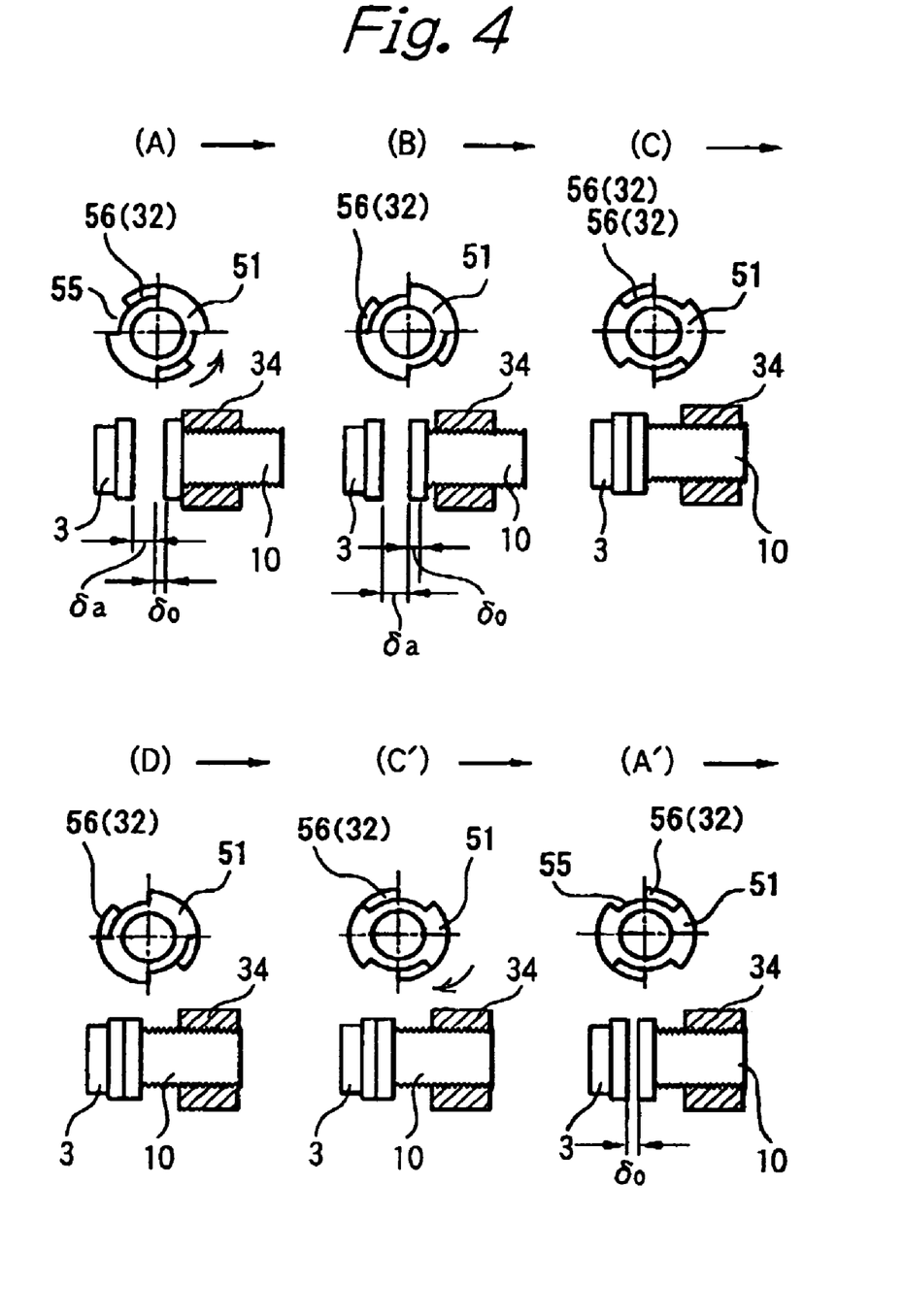
FIG. 4 is a schematic view showing the positional relationship between the ball-ramp mechanism and a piston in the motor-driven disk brake according to the present invention during operation on the assumption that there is pad wear.

When there is wear on the brake pads 3 and 4, as shown in (A) of FIG. 4, a gap δa corresponding to the pad wear is present between the inner brake pad 3 and the piston 10 in addition to a predetermined clearance (pad clearance) δ0. Further, in this initial state, the limiter 51 maintains the initial position by the set load of the coil spring 54. Therefore, as shown in (A) of FIG. 4, each engagement projection 56 of the first disk 32 is positioned at one groove end in the associated groove 55 of the a limiter 51.

If the rotor 22 of the motor 20 rotates from the above-described initial position clockwise as seen from the right-hand side of FIGS. 1 and 2 (hereinafter, the expression of "clockwise" and "counterclockwise" will be used on'the assumption that the motor-driven disk brake is seen from the right-hand side of FIGS. 1 and 2), the eccentric gear 44 constituting the speed-reducing mechanism 40 rotates on its own axis while revolving. In response to this, the first disk (rotating member) 32 in the ball-ramp mechanism 30 rotates counterclockwise with the above-described predetermined rotation ratio (speed reduction ratio N) with respect to the rotor 22. At this time, because the rotation of the second disk 34 is restrained by the wave washer 39, the balls 36 in the ball-ramp mechanism 30 roll between the ball grooves 32a and 34a. This causes the second disk 34 to advance, and the advancing motion of the second disk 34 Is transmitted to the piston 10 through the threaded portion 33. When there is no pad wear, the rotation of the first disk 32 causes each engagement projection 56 to move in the associated groove 55 of the limiter 51 from the one groove end until it abuts on the other groove end. Consequently, the pad clearance δ0 is canceled, and the piston 10 abuts on the brake pad 3 to initiate braking. However, when there is pad wear even if each engagement projection 56 of the first disk 32 has moved in the associated groove 55 of the limiter 51 until it abuts on the other groove end, i.e. even if each engagement projection 56 has moved through a distance long enough to cancel the pad clearance δ0, the gap δa corresponding to the pad wear still remains between the brake pad 3 and the piston 10 {(A)→(B) of FIG. 4}.

On the other hand, during the movement of the piston through a distance corresponding to the pad clearance δ0, the spring holder 53 and the limiter 51 maintain the non-rotating state (do not rotate relative to each other) as in the case of the second disk 34 because the rotational resistance due to the frictional force of the wave washer 39 acting on the second disk 34 and the spring force of the coil spring 54 in the pad wear compensating mechanism 50 are greater than the spring force of the coil spring 60 serving as the brake releasing mechanism. As a result, relative rotation occurs between the limiter 51 and the first disk 32 driven to rotate by the rotor 22. Consequently, the coil spring 60 serving as the brake releasing mechanism is torsionally deformed. Thus, a predetermined torque is stored in the coil spring 60.

Thereafter, if the rotor 22 rotates further each engagement projection 56 of the first disk 32 pushes the associated groove end of the limiter 51, causing the limiter 51 to rotate. At this time, because the set load of the coil spring 54 in the pad wear compensating mechanism 50 is greater than the frictional force of the wave washer 39, the rotation of the limiter 51 is transmitted to the second disk 34 through-the coil spring 54, the spring holder 53 and the pins 52. Consequently, the piston 10 advances in response to the rotation of the, second disk 34 because it is prevented from rotating by the support rod 14 and engaged with the second disk 34 through the threaded portion 33. As a result, the gap δa corresponding to the pad wear is canceled as shown in (B)→(C) of FIG. 4.

Thereafter, in response to the further rotation of the rotor 22 of the motor 20, the piston 10 pushes the inner brake pad 3 against one side of the disk rotor D. Counterforce produced at this time causes the caliper 2 to move-relative to the carrier 1 (rightward in FIG. 1). Consequently, the claw portion 5a of the claw member 5 causes the outer brake pad 4 to be pressed against, the other side of the disk rotor D. Thus, braking is initiated At this stage, each engagement projection 56 of the first disk 32 causes the limiter 51 to rotate further {(C)→(D) of FIG. 4}. However, the frictional resistance of the threaded portion 33 for thread engagement between the piston 10 and the second disk 34 increases owing to the generation of braking force (braking thrust). When the frictional resistance becomes greater than the set load of the coil spring 54 in the pad wear compensating mechanism 50, the rotation of the second disk 34 is stopped, and the rotation of the spring holder 53 connected to the second disk 34 by the pins 52 is also stopped. As a result, a difference in rotation occurs between the limiter 51 and the spring holder 53. The difference in rotation is absorbed by torsional deformation of the coil spring 54. It should be noted that as the braking operation is initiated, braking thrust is generated in the piston 10. Therefore, the controller (not shown) controls the electric current to be supplied to the motor 20 on the basis of a signal from the thrust detecting sensor 15 so that desired braking force is obtained according to the amount of, depression of the brake pedal (not shown).

When the rotor 22 of the motor 20 rotates counterclockwise from the above-described braking position, the first disk 32 in the ball-ramp mechanism 30 rotates clockwise, and the second disk 34 and the piston 10 retract together as one unit by the action of urging force of the bevel disk springs 38. Thus, the pressing force applied to the disk rotor D is released. At this time, the limiter 51 follows the rotation of the first disk 32 by the action of returning force of the coil spring 54 to return to a position at which the piston 10 begins to generate braking thrust, i.e. braking initiation position {(D)→(C') of FIG. 4}. Here, the operation of the, motor 20 is controlled so that the motor 20 rotates by an extra amount corresponding to the pad clearance δ0 from the position at which the brake pad 3 contacts the disk rotor D. Accordingly, the first disk 32 rotates further through a predetermined angle even after the pressing force has been released, to return to the position at which each engagement projection 56 abuts on the one end of the associated groove 55 of the limiter 51. Thus, the predetermined pad clearance δ0 is ensured {(C')→(A') of FIG. 4}.

It should be noted that when there is no pad wear, the above-described step whereby the gap δa corresponding to pad wear is canceled {(B)→(C) of FIG. 4} is absent, but the rest of the process is the same as that when there is pad wear.

Figure 5:
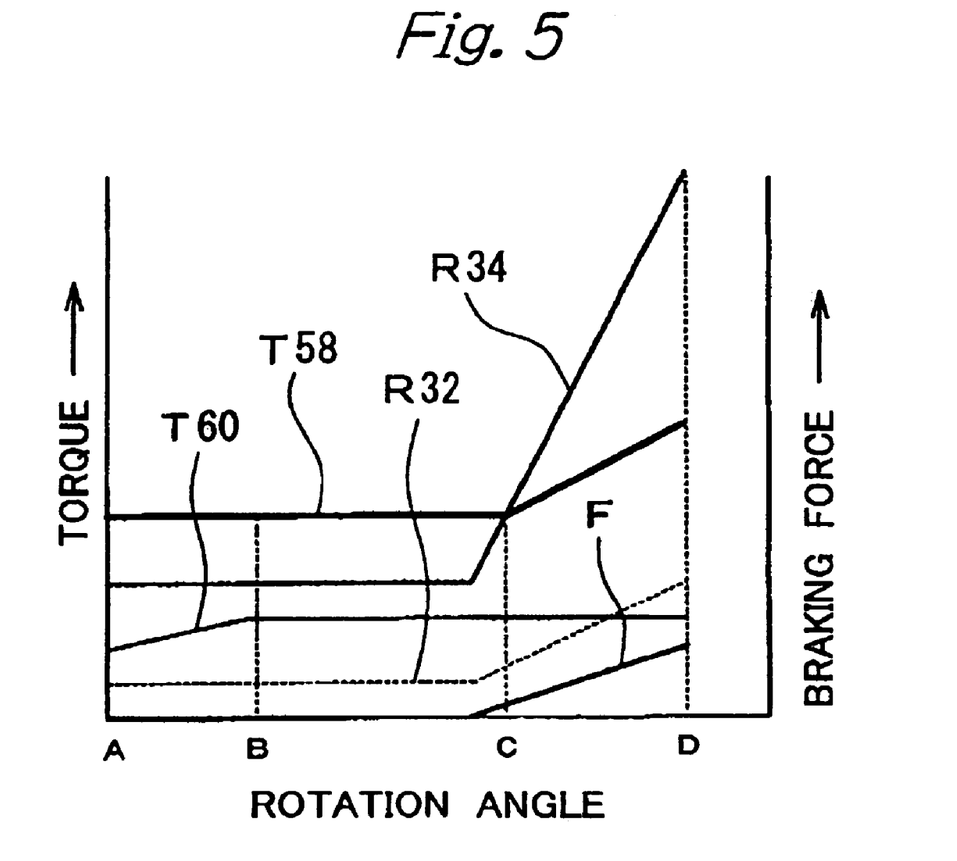
FIG. 5 is a graph showing torque generated on each constituent element and braking force generated during the braking operation of the motor-driven disk brake according to the present invention in correspondence to the position of the rotating member in the ball-ramp mechanism.

FIG. 5 is a graph showing torque generated on each constituent element during the above-described braking operation and generated braking force in correspondence to the position (rotation angle) of the first disk 32 in each state (A to D) shown in FIG. 4. In the graph: T60 represents torque generated on the coil spring 60 serving as the brake releasing mechanism; T58 represents torque generated on the coil spring 54 in the pad wear compensating mechanism 50; R32 represents rotational resistance of the first disk 32 in the ball-ramp mechanism 30; R34 represents rotational resistance of the second disk 34 in the ball-ramp mechanism 30; and F represents generated braking force.

As will be clear from the results shown In FIG. 5, torque T60 generated in the coil spring 60 rises during the step of (A)→(B) shown in FIG. 4, i.e. as the first disk 32 rotates within the range of play in the direction of rotation of the first disk 32 and the limiter 51 (i.e. engagement between the grooves 55 and the engagement projections 56). Thereafter, the torque T60 keeps a predetermined level despite further rotation of the first disk 32. In other words, the amount of deflection of the coil spring 60 is restricted within a predetermined range.

If brake lock-up occurs owing to a failure of the motor 20, the second disk 34 and the piston 10 are retracted together as one unit by the urging force of the bevel disk springs 38 and the counter-acting torque in the ball-ramp mechanism 30 due to counterforce from the brake pad 3, together with the return force of the coil spring 54, etc. Consequently, the piston 10 returns to the braking initiation position at which the piston 10 begins to generate braking thrust. In this state, the disk rotor D and the brake pad 3 are in contact with each other, but almost no braking force is generated. Thus, the brake can be regarded as being in an unlocked state. Thus, the spring 54 can constitute a part of a brake releasing mechanism as will be stated later.

Further, in this embodiment, an amount of rotational torque corresponding to the amount of deflection of the coil spring 60 during braking is stored. Therefore, the first disk 32 is rotated by this stored rotational torque, causing the second disk 34 and the piston 10 to move, thereby allowing the piston 10 to be separated completely from the brake pad 3. Because the amount of deflection of the coil spring 60 during braking is restricted within a predetermined range as stated above, it is possible to eliminate the problem that the consumption of electric power for rotating the motor 20 increases with age in accordance with the degree of wear of the, brake pads 3 and 4.

In the foregoing embodiment, the coil spring 60 is used as the brake releasing mechanism, by way of example. The coil spring 60 is wound around the first disk 32 in the ball-ramp mechanism 30 and also around the limiter 51 in the pad wear compensating mechanism 50. The first disk 32 and the limiter 51 are operatively associated with each other by engagement between the engagement projections 56 and the grooves 55. One end of the coil spring 60 is connected to the first disk 32, and the other end of the coil spring 60 is connected to the limiter 51. However, the present invention is not necessarily limited to the described arrangement. That is, the arrangement maybe such that the coil spring 60 is not used, but instead the pad wear compensating mechanism 50 is adapted to serve also as a brake releasing mechanism. In this case, the brake releasing mechanism comprises the limiter 51, the pins 52, the spring holder 53 and the coil spring 54. Using the pad wear compensating mechanism also as the brake releasing mechanism allows a reduction in the number of component parts required.

In a case where the pad wear compensate mechanism is arranged to serve also as the brake releasing mechanism, the following operation will take place if a motor failure occurs during the above-described braking owing, for example, to disconnection of the motor coil. That is the limiter 51 rotates clockwise by the action of the urging force of the coil spring 54 that has stored the difference in rotation between the limiter 51 and the spring holder 53. This causes the first disk 32 in the ball-ramp mechanism 30 to be forcedly rotated clockwise as well. Consequently, the second disk 34 and the piston 10 are retracted together as one unit by the urging force of the bevel disk springs 38. Accordingly, the force pressing the brake, pad 3 against the disk rotor D is released. Thus, the brake is automatically released. That is, the first disk 32 rotates clockwise because the spring force of the coil spring 54 for rotating the first disk 32 clockwise by torsional deformation thereof during the stage where braking thrust is generated in the piston 10 has been set greater than the rotational resistance of the first disk 32. It should be noted that, at this time, the limiter 51 returns to the position {(C) in FIG. 4} at which braking thrust begins to occur in the piston 10.

As has been detailed above, the motor-driven disk brake according to the present invention offers the following advantages. If the brake has looked up owing to a failure of the rotary actuator, the brake is automatically released by using the torque, stored in the resilient member during braking. Therefore, it is unnecessary to separately provide a drive source for releasing the brake and hence possible to achieve a size reduction and a cost reduction. In addition, reliability improves. Further, because the amount of deflection of the resilient member for storing torque becomes constant after it has risen to a certain extent, it is possible to eliminate the problem that the consumption of electric power for rotating the rotary actuator increases with age.

If a coil spring is used as the resilient member, the resilient member can be accommodated compactly in the caliper. Accordingly, it is possible to prevent an increase in size of the caliper.

What is claimed is:

1. A motor-driven disk brake having a caliper, said caliper containing:
   a piston for pressing a brake pad;
   a rotary actuator; and
   a rotary-to-rectilinear motion converting mechanism for transmitting rotation of said rotary actuator to said piston after converting it into a rectilinear motion;
   wherein said piston is driven in response to rotation of said rotary actuator to press said brake pad against a disk rotor, thereby generating braking force;
   said motor-driven disk brake further having a pad wear compensating mechanism for advancing said piston relative to a rectilinearly moving member in said rotary-to-rectilinear motion converting mechanism in accordance with wear of said brake pad, said pad wear compensating mechanism having a rotatable limiter engaged with a rotating member in said rotary-to-rectilinear motion converting mechanism with an amount of play in a direction of rotation such that the play provides a predetermined clearance between said piston and said pad after said pad wear compensating mechanism has achieved its wear compensation effect;
   wherein a resilient member is provided between the rotating member in said rotary-to-rectilinear motion converting mechanism and the limiter in said pad wear compensating mechanism, said resilient member being adapted to generate a set load greater than a non-loaded-state rotational resistance of said rotating member and to store a torque in accordance with relative rotation within the range permitted by said play between said rotating member and said limiter during braking.

2. A motor-driven disk brake according to claim 1, wherein said resilient member is a first coil spring wound concentrically with said rotating member or said limiter to store a torsional torque.

3. A motor-driven disk brake according to claim 1, wherein said rotary-to-rectilinear motion converting mechanism is a ball-ramp mechanism which comprises first and second disks each having ball grooves including slant surfaces and balls disposed between said first and second disks in said ball grooves.

4. A motor-driven disk brake according to claim 3, wherein said first disk is adapted to be rotated by the rotation of said rotary actuator and said second disk is adapted to be linearly moved by the rotation of said first disk caused by said rotary actuator.

5. A motor-driven disk brake according to claim 4, wherein said resilient member is provided between said first disk and said limiter.

6. A motor-driven disk brake according to claim 5, wherein one of said first disk and said limiter has an engagement projection and the other has a circumferentially extending groove so that said engagement projection engages with said circumferentially extending groove, said circumferentially extending groove having a circumferential length that is greater than the width of said engagement projection that provides said play.

7. A motor-driven disk brake according to claim 5, wherein a coil spring is provided between said limiter and said second disk so that said coil spring applies a set load to said limiter and said second disk, said resilient member storing a torque by a force smaller than the set load applied by said coil spring.

8. A motor-driven disk brake according to claim 7, wherein said second disk is restrained from rotation by frictional force applied thereto.

9. A motor-driven disk brake according to claim 8, wherein the frictional force applied to said second disk is greater than a force applied to said resilient member to cause said resilient member to store a torque.

10. A motor-driven disk brake according to claim 8, wherein the set load provided by said coil spring is greater than the frictional force applied to said second disk.

11. A motor-driven disk brake according to claim 2, wherein said rotary-to-rectilinear motion converting mechanism is a ball-ramp mechanism which comprises first and second disks each having ball grooves including slant surfaces and balls disposed between said first and second disks in said ball grooves.

12. A motor-driven disk brake according to claim 11, wherein said first disk is adapted to be rotated by the rotation of said rotary actuator and said second disk is adapted to be linearly moved by the rotation of said first disk caused by said rotary actuator.

13. A motor-driven disk brake according to claim 12, wherein said first coil spring is provided between said first disk and said limiter.

14. A motor-driven disk brake according to claim 13, wherein one of said first disk and said limiter has an engagement projection and the other has a circumferentially extending groove so that said engagement projection engages with said circumferentially extending groove, said circumferentially extending groove having a circumferential length that is greater than the width of said engagement projection that provides said play.

15. A motor-driven disk brake according to claim 13, wherein a second coil spring is provided between said limiter and said second disk so that said second coil spring applies a set load to said limiter and said second disk, said first coil spring storing a torque by a force smaller than the set load applied by said second coil spring.

16. A motor-driven disk brake according to claim 15, wherein said second disk is restrained from rotation by frictional force applied thereto.

17. A motor-driven disk brake according to claim 15, wherein the frictional force applied to said second disk is greater than a force applied to said first coil spring to cause said first coil spring to store a torque.

18. A motor-driven disk brake according to claim 15, wherein the set load provided by said second coil spring is greater than the frictional force applied to said second disk.

* * * * *